US012782523B2

(12) United States Patent
Takei

(10) Patent No.: US 12,782,523 B2
(45) Date of Patent: Nov. 3, 2026

(54) RANGING DEVICE, RANGING DEVICE CONTROL METHOD, AND RANGING SYSTEM

(71) Applicant: NEC Corporation, Tokyo (JP)

(72) Inventor: Daisuke Takei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 631 days.

(21) Appl. No.: 18/273,461

(22) PCT Filed: Mar. 30, 2021

(86) PCT No.: PCT/JP2021/013546

§ 371 (c)(1),
(2) Date: Jul. 20, 2023

(87) PCT Pub. No.: WO2022/208661

PCT Pub. Date: Oct. 6, 2022

(65) Prior Publication Data

US 2024/0103141 A1 Mar. 28, 2024

(51) Int. Cl.

| | |
|---|---|
| ***G01S 7/484*** | (2006.01) |
| ***G01S 7/4861*** | (2020.01) |
| ***G01S 7/497*** | (2006.01) |

(52) U.S. Cl.

CPC ............ *G01S 7/484* (2013.01); *G01S 7/4861* (2013.01); *G01S 7/497* (2013.01)

(58) Field of Classification Search

CPC ........ G01S 7/484; G01S 7/4861; G01S 7/497; G01S 7/4814; G01S 7/4868; G01S 17/42

See application file for complete search history.

(56) References Cited

U.S. PATENT DOCUMENTS

2004/0125357 A1* 7/2004 Ohtomo .................. G01S 17/08 356/5.13
2005/0057741 A1* 3/2005 Anderson ............. G01S 7/4817 356/5.01

(Continued)

FOREIGN PATENT DOCUMENTS

CN 210363862 U 4/2020
JP 2012-154863 A 8/2012

(Continued)

OTHER PUBLICATIONS

English Translation JP 2014517921 (Year: 2014).*

(Continued)

*Primary Examiner* — Fernando Alcon
(74) *Attorney, Agent, or Firm* — Sughrue Mion, PLLC

(57) ABSTRACT

To improve spatial resolution during measurement via LiDAR or the like, a ranging device comprises: at least one memory storing instructions; and at least one processor executing the instructions to measure the distance between a light-emitting device and an object on the basis of reflected light of a laser beam that is incident on a first beam diameter at a incidence position, adjust the beam diameter, of the laser beam on the incidence position, to a second beam diameter in accordance with the abovementioned distance, and generate sensing data pertaining to the object on the basis of reflected light corresponding to a laser beam that is incident on a second beam diameter at the incidence position. The at least one processor adjusts the beam diameter of the laser beam such that the second beam diameter at the incidence position is smaller than the first beam diameter.

19 Claims, 9 Drawing Sheets

(56) References Cited

U.S. PATENT DOCUMENTS

| | | | | |
|---|---|---|---|---|
| 2016/0123877 | A1* | 5/2016 | Cvijetic | G01S 7/4802<br>356/300 |
| 2016/0202090 | A1* | 7/2016 | Cvijetic | G01S 17/66<br>356/614 |
| 2016/0245903 | A1* | 8/2016 | Kalscheur | G01S 7/4814 |
| 2019/0293761 | A1* | 9/2019 | Hinderling | G01C 15/002 |
| 2019/0364387 | A1 | 11/2019 | Mian | |
| 2020/0333460 | A1* | 10/2020 | Tsuji | G01S 17/89 |
| 2022/0155416 | A1* | 5/2022 | Zhu | G01S 7/484 |
| 2022/0236413 | A1* | 7/2022 | Grange | G01S 7/4816 |
| 2024/0310519 | A1* | 9/2024 | Honda | G01S 7/4814 |

FOREIGN PATENT DOCUMENTS

| | | | | |
|---|---|---|---|---|
| JP | 2014517921 | A * | 7/2014 | G01S 17/14 |
| JP | 2016-048237 | A | 4/2016 | |
| WO | 2019/098263 | A1 | 5/2019 | |

OTHER PUBLICATIONS

JP Office Communication for JP Application No. 2023-509966, mailed on Jun. 4, 2024 with English Translation.

International Search Report for PCT Application No. PCT/JP2021/013546, mailed on Jun. 8, 2021.

English translation of Written opinion for PCT Application No. PCT/JP2021/013546, mailed on Jun. 8, 2021.

* cited by examiner

RANGING DEVICE, RANGING DEVICE CONTROL METHOD, AND RANGING SYSTEM

This application is a National Stage Entry of PCT/JP2021/013546 filed on Mar. 30, 2021, the contents of all of which are incorporated herein by reference, in their entirety.

TECHNICAL FIELD

The present disclosure relates to a ranging device, a ranging device control method, and a ranging system that are able to improve spatial resolution during measurement via, for example, light detection and ranging (LiDAR).

BACKGROUND ART

In recent years, a technique called LiDAR, for emitting light to an object and detecting, based on reflected light received from the object, a surface state or the like of the object, has been used. For example, PTL 1 discloses a technique for improving distance measurement resolution during measurement via LiDAR.

CITATION LIST

Patent Literature

PTL 1: Japanese Unexamined Patent Application Publication No. 2012-154863

SUMMARY OF INVENTION

Technical Problem

Further, in recent years, improvement of spatial resolution during measurement via LiDAR has been required, from a perspective of detecting a fine scratch, a fine crack, a fine rugged shape, or the like on a surface of an object.

The present disclosure has been made in view of the above-described problem, and an object of the present disclosure is to provide a ranging device, a ranging device control method, and a ranging system that are able to improve spatial resolution during measurement via LIDAR or the like.

Solution to Problem

A ranging device according to the present disclosure includes:

a distance measuring means for measuring a distance between a light-emitting means and an incidence position of an object, based on reflected light of laser light being incident with a first beam diameter on the incidence position from the light-emitting means;

a beam diameter adjustment means for adjusting a beam diameter of the laser light being incident on the incidence position to a second beam diameter according to the distance; and a data generation means for generating sensing data relating to the object, based on reflected light associated with laser light being incident with the second beam diameter on the incidence position from the light-emitting means, wherein the beam diameter adjustment means adjusts a beam diameter of the laser light in such a way that the second beam diameter at the incidence position becomes smaller than the first beam diameter at the incidence position.

Alternatively, a ranging device control method according to the present disclosure includes:

measuring a distance between a light-emitting means and an incidence position of an object, based on reflected light of laser light being incident with a first beam diameter on the incidence position from the light-emitting means;

adjusting a beam diameter of laser light being incident on the object to a second beam diameter smaller than the first beam diameter according to the distance; and generating sensing data relating to the object, based on reflected light associated with laser light being incident with the second beam diameter from the light-emitting means.

Alternatively, a ranging system according to the present disclosure includes:

a distance measuring means for measuring a distance between a light-emitting means and an incidence position of an object, based on reflected light of laser light being incident with a first beam diameter on the incidence position from the light-emitting means;

a beam diameter adjustment means for adjusting a beam diameter of the laser light being incident on the incidence position to a second beam diameter according to the distance; and a data generation means for generating sensing data relating to the object, based on reflected light associated with laser light being incident with the second beam diameter on the incidence position from the light-emitting means, wherein the beam diameter adjustment means adjusts a beam diameter of the laser light in such a way that the second beam diameter at the incidence position becomes smaller than the first beam diameter at the incidence position.

Advantageous Effects of Invention

The present disclosure can provide a ranging device, a ranging device control method, and a ranging system that are able to improve spatial resolution during measurement via LiDAR or the like.

EXAMPLE EMBODIMENT

First Example Embodiment

Figure 1:
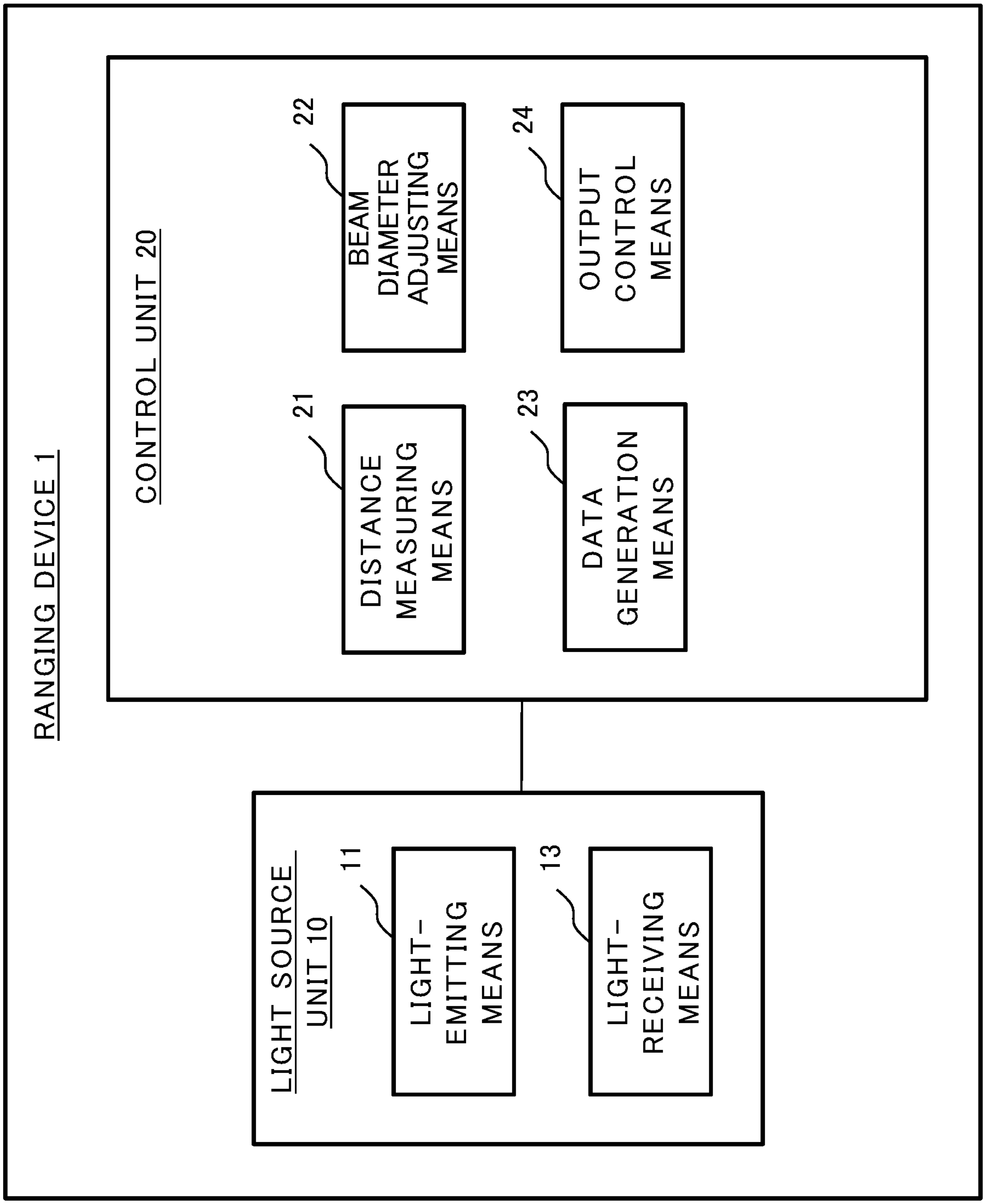
FIG. 1 is a block diagram illustrating a configuration example of a ranging device according to a first example embodiment of the present invention.
Figure 4:
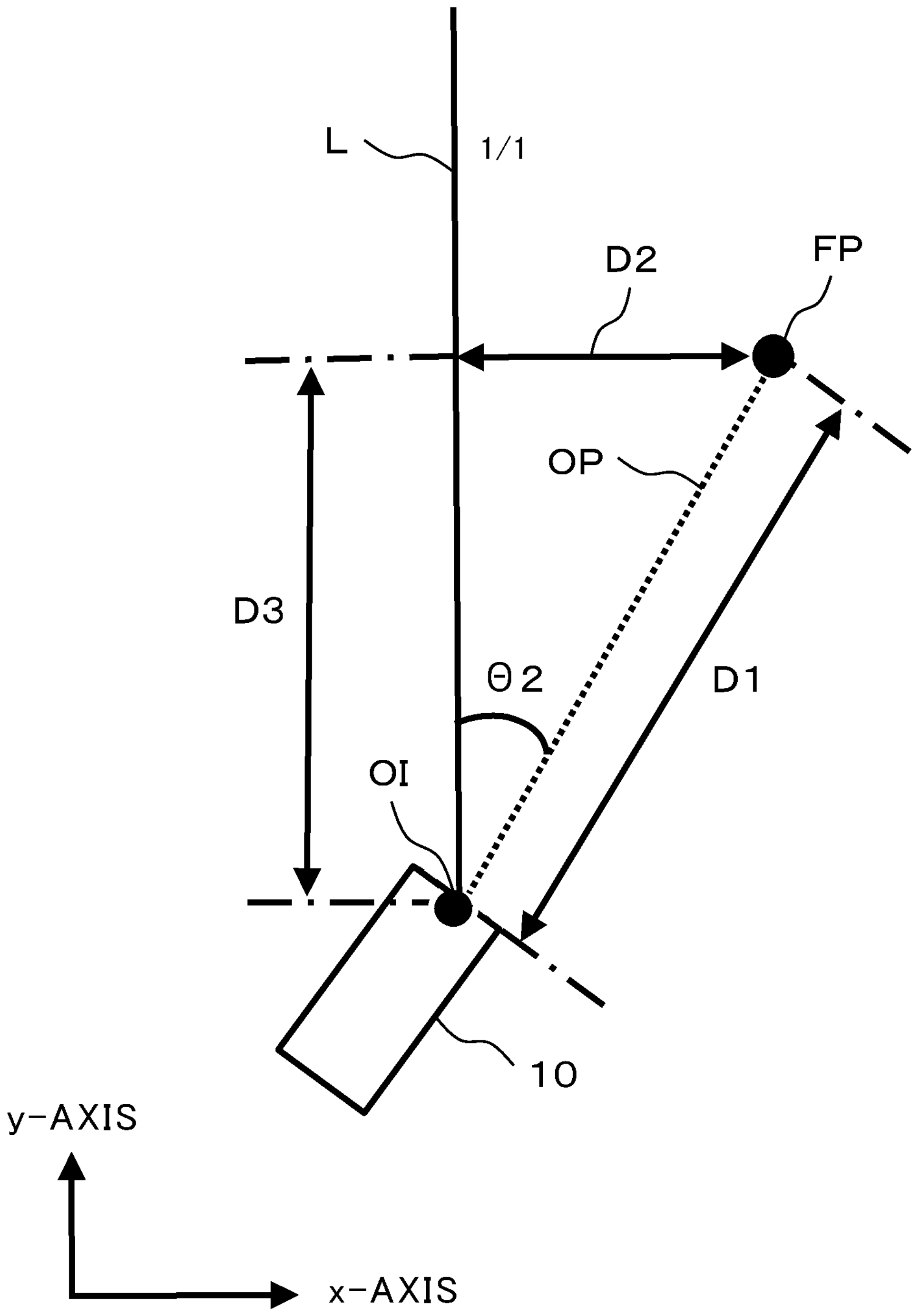
FIG. 4 is a diagram for describing a detail of the ranging device according to the first example embodiment of the present invention.
Figure 5:
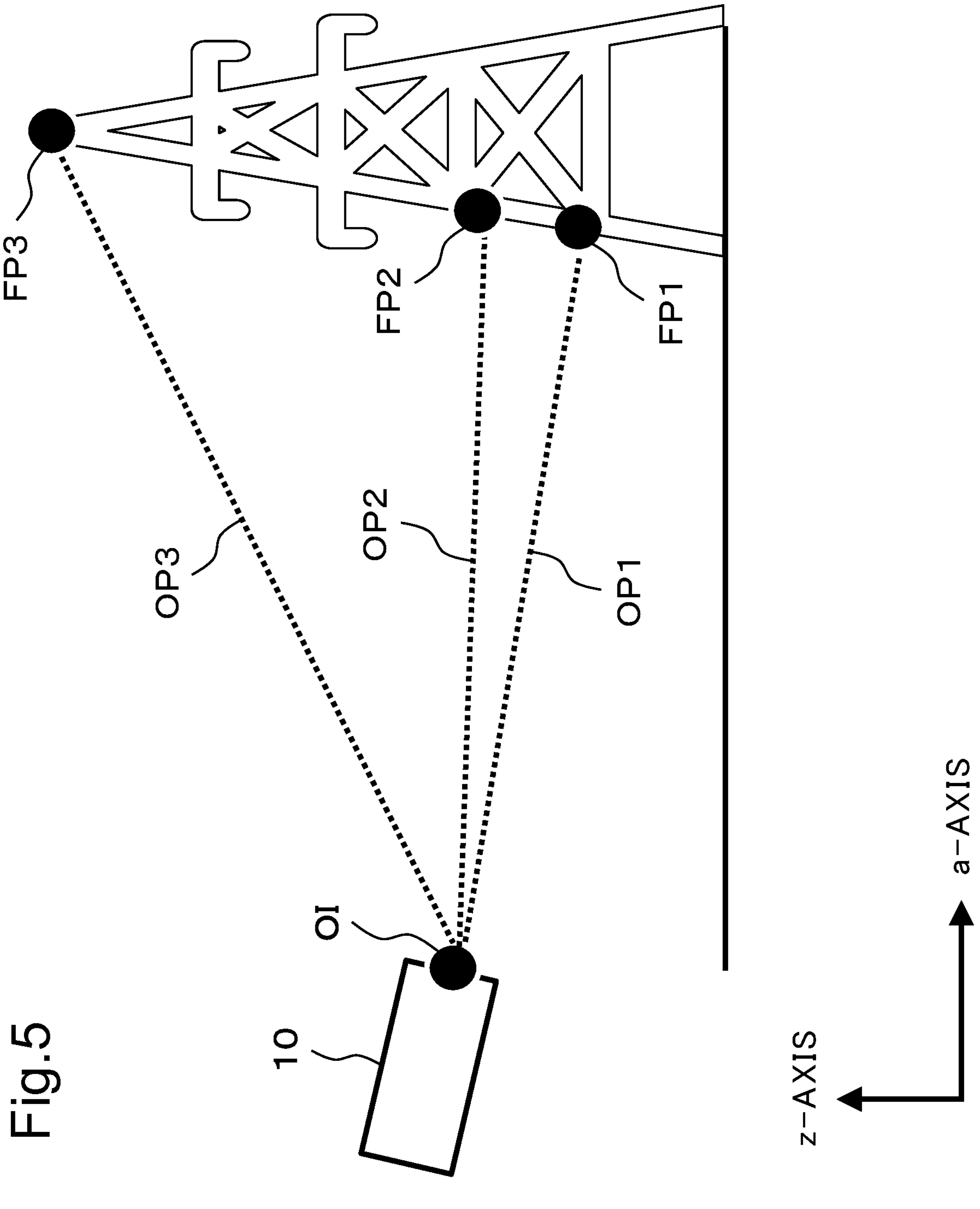
FIG. 5 is a diagram for describing a detail of the ranging device according to the first example embodiment of the present invention.
Figure 6:
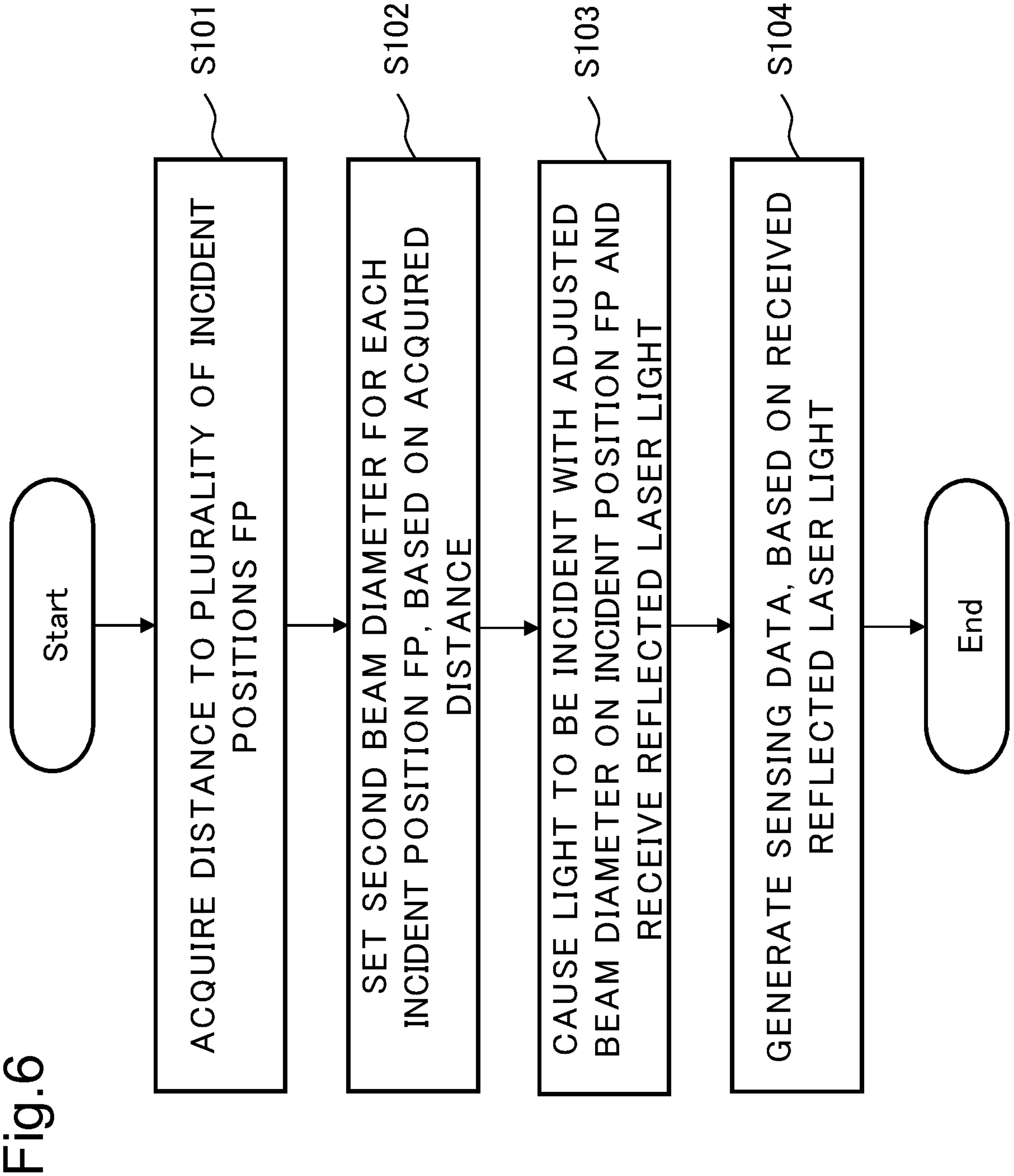
FIG. 6 is a flowchart illustrating an operation example of the ranging device according to the first example embodiment of the present invention.

A ranging device 1 according to a first example embodiment will be described based on FIGS. 1, 2, 3, 4, 5, and 6. FIG. 1 is a block diagram illustrating a configuration example of the ranging device 1. FIGS. 2, 3, 4, and 5 are diagrams for describing a detail of the ranging device 1. FIG. 6 is a flowchart diagram for describing an operation example of the ranging device 1.

A configuration of the ranging device 1 will be described. The ranging device 1 includes a light source unit 10 and a control unit 20. Note that, in FIG. 1, the light source unit 10 and the control unit 20 are provided integrally, but may be separated from each other. The light source unit 10 and the control unit 20 can communicate with each other via an unillustrated communication means.

The light source unit 10 includes a light-emitting means 11 and a light-receiving means 13. The light-emitting means 11 irradiates a monitoring target MT with laser light. Specifically, the laser light is pulsed laser light. For example, the light-emitting means 11 radiates laser light from an optical input/output end OI provided on the light source unit 10, as illustrated in FIGS. 2, 3, 4, and 5. Thereby, the radiated laser light propagates along an optical path OP and is incident on an incidence position FP of the monitoring target MT. The optical path OP is a line segment connecting between the optical input/output end OI and the incidence position FP. Herein, it is assumed that the monitoring target MT is a communication steel tower. The light-emitting means 11 irradiates the monitoring target MT with laser light by emitting laser light at an angle set in advance.

The light-receiving means 13 receives laser light (hereinafter, referred to as "laser reflected light") reflected at the incidence position FP of the monitoring target MT. For example, the light-receiving means 13 receives laser reflected light from the monitoring target MT via the optical path OP and the optical input/output end OI, in examples in FIGS. 2, 3, and 4. Further, the light-receiving means 13 can receive laser reflected light from different reflection points FP1, FP2, and FP3 as illustrated in FIG. 5, by changing a direction of radiation of laser light by the light source unit 10 as will be described later.

Next, the control unit 20 will be described. The control unit 20 includes a distance measuring means 21, a beam diameter adjustment means 22, a data generation means 23, and an output control means 24. Note that, the distance measuring means 21, the beam diameter adjustment means 22, the data generation means 23, and the output control means 24 are not necessarily provided in one control unit 20, and may be provided in different devices and operate as one system. Further, a program causing an information processing device such as a computer to achieve each of the distance measuring means 21, the beam diameter adjustment means 22, the data generation means 23, and the output control means 24 may be stored by a storage medium such as a hard disk drive.

The distance measuring means 21 measures a distance between the light-emitting means 11 and the incidence position FP, based on reflected light of laser light incident on the incidence position FP of the monitoring object MT from the light-emitting means 11.

Figure 2:
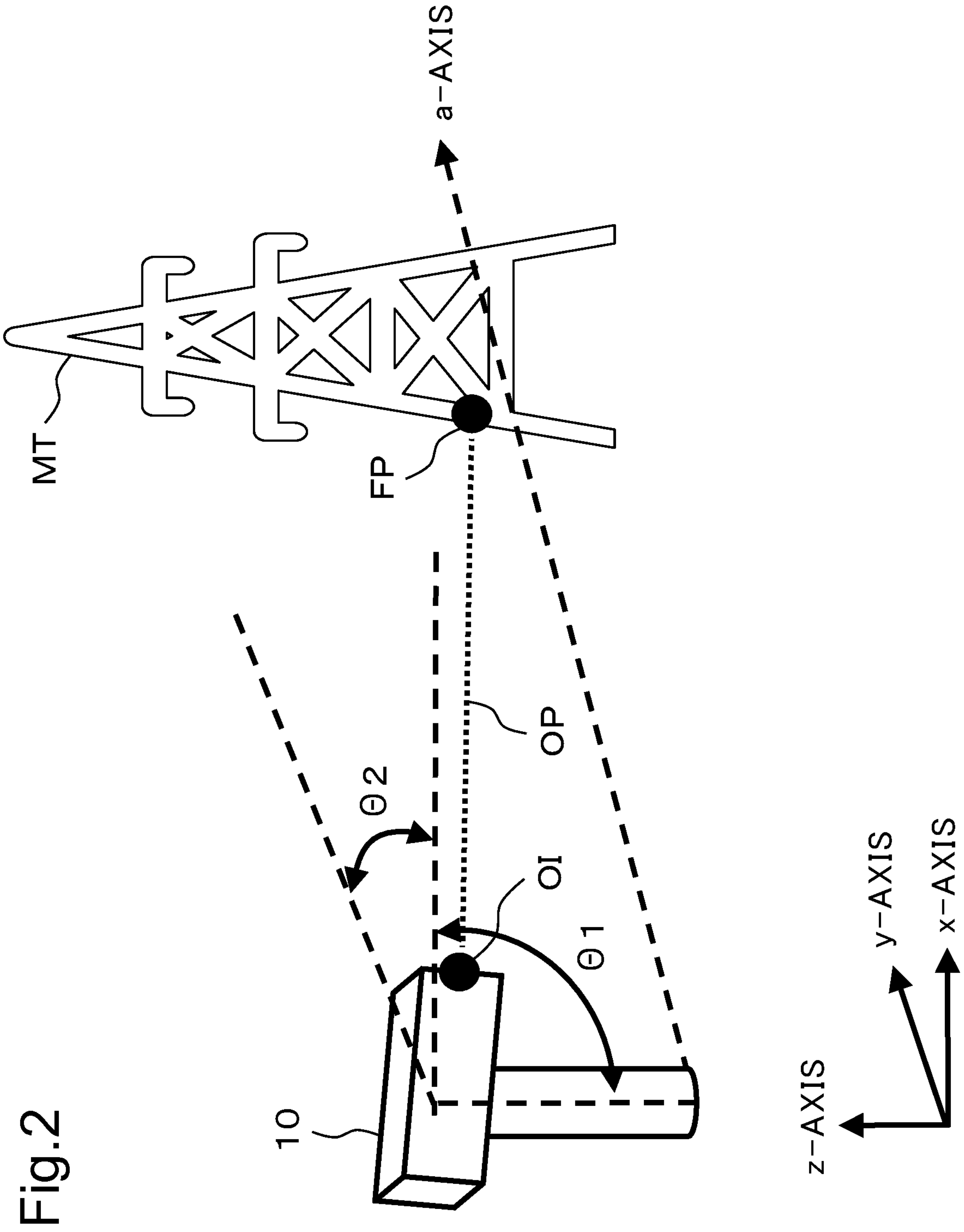
FIG. 2 is a diagram for describing a detail of the ranging device according to the first example embodiment of the present invention.
Figure 3:
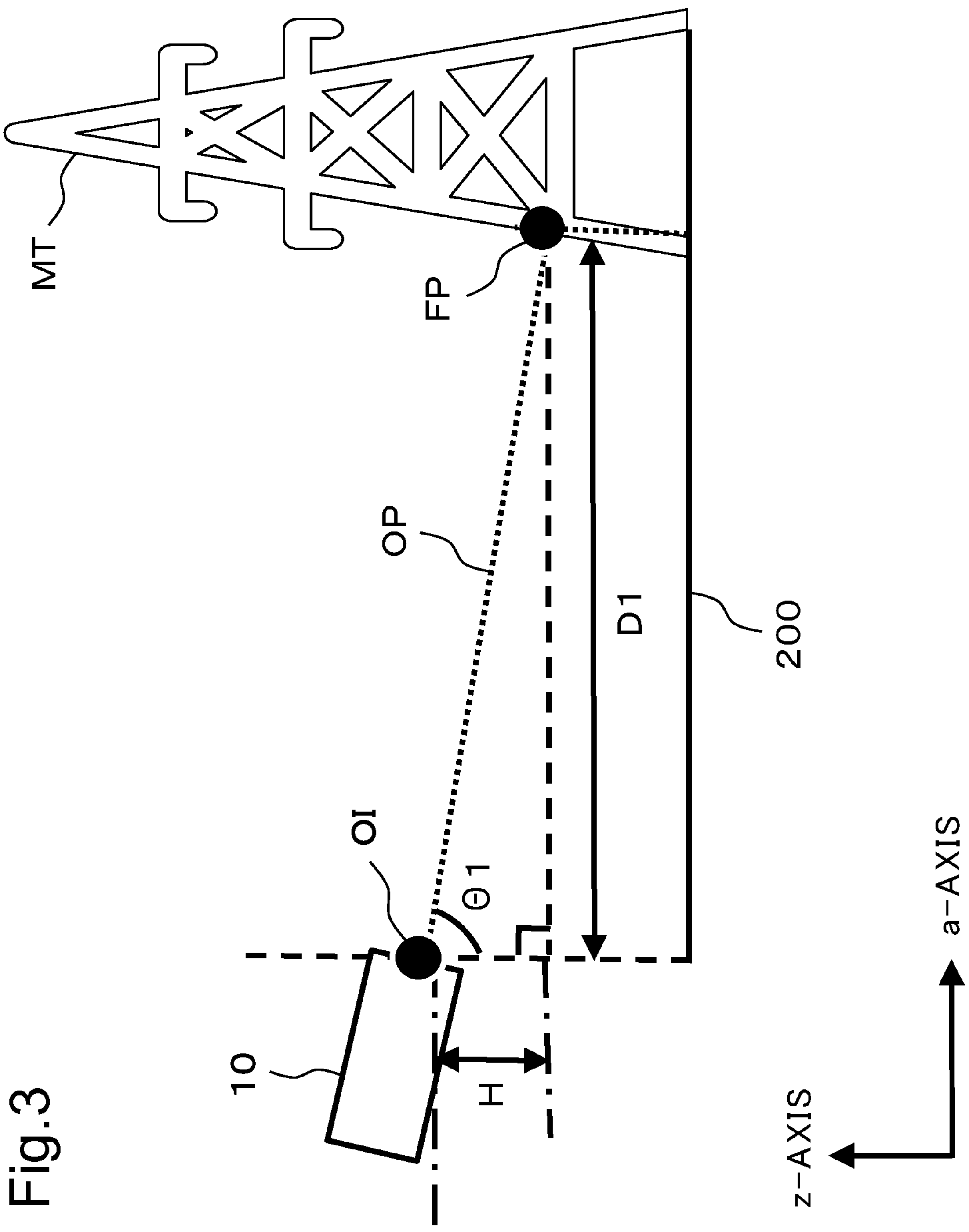
FIG. 3 is a diagram for describing a detail of the ranging device according to the first example embodiment of the present invention.

Herein, a detail of a method of measuring a distance between the light-emitting means 11 and the incidence position FP will be described by using FIGS. 2, 3, 4, and 5. FIG. 2 illustrates a positional relationship between the light source unit 10 and the monitoring target MT by using an x-axis, a y-axis, and a z-axis. FIG. 3 illustrates a positional relationship between the light source unit 10 and the monitoring target MT by using a z-axis and an a-axis. The a-axis is acquired by orthogonally projecting the optical path OP onto an x-y plane. FIG. 4 illustrates a positional relationship between the light source unit 10 and the monitoring target MT on an x-y plane.

The light-emitting means 11 emits laser light in a direction indicated by any elevation/depression angle θ1 with an x-y plane as a reference, as illustrated in FIG. 2. The elevation/depression angle θ1 in FIG. 3 is an angle formed by a line extending vertically downward from the optical input/output end OI of laser light and the optical path OP.

Further, the light-emitting means 11 emits laser light in a direction indicated by any azimuth θ2 with the x-axis as a reference, as illustrated in FIG. 2. The azimuth θ2 in FIG. 4 is an angle formed by a reference line L set on the x-y plane and the optical path OP. Each of the elevation/depression angle θ1 and the azimuth θ2 is set by the distance measuring means 21 independently from each other.

The distance measuring means 21 acquires a length of the optical path OP from a period of time (hereinafter, referred to as time t) from radiation of laser light by the light-emitting means 11 to reception of laser reflected light by the light-receiving means 13. Specifically, a length of the optical path OP is acquired by multiplying a value of time t by speed of light and then dividing the value by 2.

At least one of the elevation/depression angle θ1 and the azimuth θ2 is changed by the light source unit 10, and thereby laser light is incident on different incidence positions FP. The light source unit 10 receives reflected laser light reflected at a plurality of incidence positions FP of the monitoring target MT, by radiating laser light according to a plurality of elevation/depression angles θ1 and a plurality of azimuths θ2 determined in advance. Thereby, the distance measuring means 21 acquires a distance (a length of the optical path OP) from the optical input/output end OI of the light-emitting means 11 for each of a plurality of incidence positions FP of the monitoring target MT.

For example, the light source unit 10 makes laser light incident on different incidence positions FP, by changing at least one of the elevation/depression angle θ1 and the azimuth θ2. For example, the light source unit 10 outputs laser light along an optical path OP1, an optical path OP2, and an optical path OP3 illustrated in FIG. 5, by changing the elevation/depression angle θ1, and receives laser reflected light from each of the incidence positions FP1, FP2, and FP3. The distance measuring means 21 acquires a distance (a length of the optical path OP) to each incidence position according to the above-described method of measuring a distance. In this case, the distance measuring means 21 outputs, to the beam diameter adjustment means 22, the elevation/depression angle θ1 and the azimuth θ2 at a point in time of emitting laser light, in association with a distance to an incidence position at which the laser light is reflected.

The beam diameter adjustment means 22 adjusts a beam diameter of laser light being incident on the incidence position FP of an object from the light-emitting means 11, according to a distance acquired by the distance measuring means 21. As described above, the distance measuring means 21 measures a distance between the incidence position FP and the light-emitting means 11, based on laser reflected light of laser light output from the light-emitting means 11. When the distance measuring means 21 measures a distance, the light-emitting means 11 emits laser light having a beam diameter determined in advance, from a beam expander provided in the light-emitting means 11. In this case, a distance between a plurality of lenses of the beam expander is set in such a way that parallel laser light is emitted from the beam expander. The laser light being parallel at a point in time of emission diffuses before incidence on the incidence position FP, and is then incident on the incidence position FP. It is assumed that a beam diameter at a point in time when the laser light being parallel at a point in time of emission is incident on the incidence position FP is a first beam diameter. The distance measuring means 21 can acquire the first beam diameter, based on a distance to the incidence position FP and a beam diameter of laser light at a point in time of emission. Note that, the beam expander may be provided in the light source unit 10, or may be provided in the control unit 20.

The beam diameter adjustment means 22 sets, based on a distance to an incidence position output from the distance measuring means 21, a beam diameter of laser light being incident on the incidence position FP from the light-emitting means 11 at the elevation/depression angle θ1 and the azimuth θ2 associated with the incidence position, as a second beam diameter. Specifically, the beam diameter adjustment means 22 controls the beam expander in such a way that laser light converges at a distance acquired by the distance measuring means 21 more than at a point in time of emission. For example, the beam diameter adjustment means 22 refers to a lookup table in which a distance between a plurality of lenses included in the beam expander and a distance to the incidence position FP are associated with each other. Thereby, the beam diameter adjustment means 22 can make laser light incident on the incidence positions FP at different distances with the second beam diameter smaller than the first beam diameter, by adjusting a distance between lenses according to a distance to the incidence position FP, from a point in time of emitting parallel laser light. The beam diameter adjustment means 22 outputs, to the data generation means 23, the elevation/depression angle θ1 and the azimuth θ2 in association with the second beam diameter.

The data generation means 23 generates sensing data relating to the object MT, based on reflected light associated with laser light incident with the second beam diameter on the incidence position FP from the light-emitting means 11. Specifically, the data generation means 23 outputs, to the light-emitting means 11, a distance to the incidence position FP associated with the elevation/depression angle θ1 and the azimuth θ2 from the beam diameter adjustment means 22. The light-emitting means 11 outputs laser light to different incidence positions FP, by changing at least one of the elevation/depression angle θ1 and the azimuth θ2, similarly to the above. In this case, the light-emitting means 11 controls the beam expander in such a way that, every time changing at least one of the elevation/depression angle θ1 and the azimuth θ2, laser light is incident with the second beam diameter on the incidence position FP associated with the post-change elevation/depression angle θ1 and the azimuth θ2. The data generation means 23 generates sensing data of the monitoring object MT, based on laser reflected light of laser light incident on the monitoring object MT with the second beam diameter.

The sensing data are generated based on, for example, intensity of laser reflected light. For example, when the monitoring object MT is a communication steel tower, progress of deterioration causes cracking. Laser light incident on a part with cracking is more likely to diffuse than laser light incident on a part with no cracking. Thus, laser reflected light of laser light incident on a part with cracking has lower intensity than laser reflected light of laser light incident on a part with no cracking. In view of this, when laser reflected light having intensity equal to or less than a threshold value is received by the light-receiving means 13, the data generation means 23 detects data indicating that cracking has occurred at the incidence position FP of laser light, as sensing data.

Further, for example, when the monitoring object MT is a communication steel tower, a bolt attached to the communication steel tower may come off from a screw hole in some cases. When a bolt has come off, laser light is incident on a screw hole and thus is more likely to diffuse than before the bolt comes off. Thus, laser reflected light of laser light incident on a screw hole has lower intensity than laser reflected light of laser light incident on a bolt. In view of this, the data generation means 23 makes laser light having the second beam diameter incident on the incidence position FP of the object MT a plurality of times from the light-emitting means 11, and receives laser reflected light a plurality of times. When intensity of laser reflected light from a particular incidence position FP drops lower than intensity acquired previously from the same incidence position FP, the data generation means 23 generates data indicating that a bolt has come off at the incidence position FP, as sensing data.

Further, in this case, the light-emitting means 11 outputs laser light in such a way that, every time changing at least one of the elevation/depression angle θ1 and the azimuth θ2, laser light is incident on the incidence position FP with the second beam diameter associated with the post-change elevation/depression angle θ1 and the azimuth θ2. The data generation means 23 may generate a three-dimensional model of the monitoring target MT, based on reflected light from a plurality of incidence positions. The three-dimensional model is an assembly of points whose positions are uniquely determined by an x-axis coordinate, a y-axis coordinate, and a z-axis coordinate. The three-dimensional model is, for example, a three-dimensional point cloud model. The data generation means 23 acquires an x-coordinate, a y-coordinate, and a z-coordinate of each of the incidence positions FP, plots the acquired coordinates on a coordinate system consisting of an x-axis, a y-axis, and a z-axis, and thereby generates a three-dimensional model of the monitoring target MT.

In this case, the data generation means 23 can calculate a difference (H in FIG. 3) between a z-coordinate of the optical input/output end OI of laser light and a z-coordinate of the incidence position FP of laser light, by multiplying a length of the optical path OP by cos θ1. Thereby, the data generation means 23 acquires a relative position of the incidence position FP on the z-axis relative to the optical input/output end OI.

Furthermore, the data generation means 23 calculates a length (D1 in FIG. 4) of the optical path OP projected on the x-y plane, by multiplying a length of the optical path OP by sin θ1. D1 is a length of a line segment connecting between the optical input/output end OI and the incidence position FP of laser light on the x-y plane, as illustrated in FIG. 4. The data generation means 23 acquires a difference (D2 in FIG. 4) between an x-coordinate of the optical input/output end OI and an x-coordinate of the incidence position FP, by multiplying D1 by sin θ2. Further, the data generation means 23 acquires a difference (D3 in FIG. 4) between a y-coordinate of the optical input/output end OI and a y-coordinate of the incidence position FP, by multiplying D1 by cos θ2.

With a procedure described above, the data generation means 23 can acquire a relative position of the incidence position FP on each axis relative to the optical input/output end D1. By repeating the above procedure, the data generation means 23 acquires a relative position of a plurality of incidence positions FP on each axis relative to the optical input/output end D1, and generates a three-dimensional model.

The output control means 24 executes control of outputting sensing data generated by the data generation means 23. For example, when instructed by an unillustrated external device, the output control means 24 outputs sensing data to the external device.

In the above, one example of the configuration of the ranging device 1 has been described. Next, an operation example of the ranging device will be described by using FIG. 6.

The distance measuring means 21 acquires a distance to a plurality of incidence positions FP (S101). Specifically, the distance measuring means 21 acquires a distance from the optical input/output end OI to an incidence position (a length of the optical path OP in FIGS. 2 to 4), based on the time t from when laser light emitted by the light-emitting means 11 is incident on the incidence position FP with the first beam diameter to when laser reflected light is received by the light-receiving means 13 from the incidence position FP. The distance measuring means 21 acquires a distance from the optical input/output end OI to each of a plurality of incidence positions, by changing at least one of the elevation/depression angle θ1 and the azimuth θ2. The distance measuring means 21 outputs, to the beam diameter adjustment means 22, the elevation/depression angle θ1 and the azimuth θ2 at a point in time of emitting laser light, in association with a distance to an incidence position at which the laser light is reflected.

The beam diameter adjustment means 22 sets the second beam diameter for each incidence position FP, based on the acquired distance (S102). Specifically, the beam diameter adjustment means 22 sets, based on the distance to the incidence position FP output from the distance measuring means 21, a beam diameter of laser light to be incident on the incidence position FP from the light-emitting means 11 at the elevation/depression angle θ1 and the azimuth θ2 associated with the incidence position FP, as the second beam diameter. The beam diameter adjustment means 22 outputs, to the data generation means 23, the elevation/depression angle θ1 and the azimuth θ2 in association with the second beam diameter.

The data generation means 23 causes the light source unit 10 to make laser light incident on the incidence position FP with the adjusted second beam diameter and receive reflected laser light (S103). In this case, the light-emitting means 11 controls the beam expander included in the light-emitting means 11 in such a way that, every time changing at least one of the elevation/depression angle θ1 and the azimuth θ2, laser light is incident on the incidence position FP with the second beam diameter associated with the post-change elevation/depression angle θ1 and the azimuth θ2.

The data generation means 23 generates sensing data, based on the laser reflected light received by the light-receiving means 13 (S104). Specifically, the data generation means 23 generates at least one of data indicating that cracking has occurred at an incidence position, data indicating that a bolt has come off at an incidence position, and a three-dimensional model, as described above.

In the above, the ranging device 1 has been described. As described above, the ranging device 1 includes the distance measuring means 21, the beam diameter adjustment means 22, and the data generation means 23. The distance measuring means 21 measures a distance between the light-emitting means 11 and the incidence position FP of an object, based on reflected light of laser light incident with the first beam diameter on the incidence position FP from the light-emitting means 11. The beam diameter adjustment means 22 adjusts a beam diameter of laser light being incident on the incidence position FP from the light-emitting means 11 to the second beam diameter, according to the distance between the light-emitting means 11 and the incidence position FP. The data generation means 23 generates sensing data relating to the object, based on reflected light associated with the laser light incident with the second beam diameter on the incidence position FP from the light-emitting means 11. Further, the beam diameter adjustment means 22 adjusts a beam diameter of the laser light in such a way that the second beam diameter at the incidence position becomes smaller than the first beam diameter at the incidence position.

As described above, in the ranging device 1, sensing data are generated based on reflected light of laser light having the second beam diameter adjusted according to a distance between the light-emitting means 11 and the incidence position FP. In general, light has a property of diffusing when propagating a longer distance in a free space. Thus, even laser light diffuses when a distance from an emission position from which the laser light is emitted to a position of incidence is long. Thus, when an object is irradiated with light by using LiDAR, a beam diameter of laser light incident on a position far from an emission position is larger than a beam diameter of laser light incident on a position close to an emission position, and thus, resolution during measurement using LiDAR declines at a position far from an emission position.

Meanwhile, in the above ranging device 1, a beam diameter (second beam diameter) at an incidence position of laser light for generating sensing data is adjusted according to a distance between the light-emitting means 11 and the incidence position FP. Thus, the ranging device 1 prevents decline of resolution during measurement using LiDAR even at a position far from an emission position by setting the second beam diameter smaller than the first beam diameter, and thus, can improve spatial resolution. Further, the data generation means 23 generates sensing data by using laser light having the second beam diameter adjusted according to a distance between the light-emitting means 11 and the incidence position FP, and thus, generates sensing data having spatial resolution appropriate to the second beam diameter. Thereby, a user or the like of the ranging device 1 can more accurately recognize a state of an object even at a distant position by referring to sensing data.

Note that, in FIG. 1, components of the light-emitting means 11, the light-receiving means 13, the distance measuring means 21, the beam diameter adjustment means 22, the data generation means 23, and the output control means 24 are provided in one ranging device 1. Meanwhile, the components are not necessarily provided in one device, and may be provided in mutually different devices and operate as one system.

Next, a ranging device 1A will be described by using FIG. 7. The ranging device 1A is a modification example of the ranging device 1. The ranging device 1A includes a light source unit 10 and a control unit 20, similarly to the ranging device 1. The ranging device 1A is different from the ranging device 1 in that the control unit 20 further includes an intensity adjustment means 31 and a light irradiation limiting means 32. Note that, a distance measuring means 21, a beam diameter adjustment means 22, a data generation means 23, an output control means 24, the intensity adjustment means 31, and the light irradiation limiting means 32 are not necessarily provided in one control unit 20, and may be provided in different devices and operate as one system. Further, a program causing an information processing device such as a computer to achieve each of the distance measuring means 21, the beam diameter adjustment means 22, the data generation means 23, the output control means 24, the intensity adjustment means 31, and the light irradiation limiting means 32 may be stored by a storage medium such as a hard disk drive.

The intensity adjustment means 31 causes a light-emitting means 11 to output laser light being incident on the incidence position FP with the second beam diameter with intensity appropriate to a distance acquired by the distance measuring means 21. For example, the intensity adjustment means 31 causes the light-emitting means 11 to output laser light being incident on the incidence position FP with the second beam diameter, with higher intensity for a longer distance.

As indicated in description of the ranging device 1, the light-emitting means 11 outputs laser light in such a way that, every time changing at least one of the elevation/depression angle θ1 and the azimuth θ2, laser light is incident with the second beam diameter associated with the post-change elevation/depression angle θ1 and the azimuth θ2. In this case, every time the light-emitting means 11 changes at least one of the elevation/depression angle θ1 and the azimuth θ2, the intensity adjustment means 31 causes the light-emitting means 11 to output laser light being incident with the second beam diameter, with intensity appropriate to a distance to an incidence position associated with the post-change elevation/depression angle θ1 and the azimuth θ2.

Light tends to attenuate largely when propagating a longer distance in a free space. Thus, in LiDAR, intensity of laser reflected light is more likely to be low when a distance from a position of emission of laser light to an incidence position is longer. In LiDAR, too-low intensity of laser reflected light adversely affects measurement. Meanwhile, in the ranging device 1A, the intensity adjustment means 31 causes the light-emitting means 11 to output laser light being incident with the second beam diameter, with intensity appropriate to a distance acquired by the distance measuring means 21. Thus, the ranging device 1A can increase intensity of laser light when a distance from the optical input/output end OI to a focal position FP is long, and thus, can prevent intensity of laser reflected light from becoming low.

The light irradiation limiting means 32 causes the light-emitting means 11 not to output laser light being incident on the incidence position FP with the second beam diameter, to the incidence position FP having a distance less than a threshold value among distances from the optical input/output end OI to each of a plurality of focal positions FP. Specifically, the light irradiation limiting means 32 causes the light-emitting means 11 not to emit laser light being incident on the incidence position FP with the second beam diameter, at the elevation/depression angle θ1 and the azimuth θ2 associated with the incidence position FP having the distance less than a threshold value.

Meanwhile, the light irradiation limiting means 32 causes the light-emitting means 11 to output laser light being incident on the incidence position FP with the second beam diameter, to the incidence position FP having a distance equal to or more than a threshold value among distances from the optical input/output end OI to each of a plurality of focal positions FP. Specifically, the light irradiation limiting means 32 causes the light-emitting means 11 to emit laser light being incident on the incidence position FP with the second beam diameter, at the elevation/depression angle θ1 and the azimuth θ2 associated with the incidence position FP having the distance equal to or more than a threshold value.

In this case, the data generation means 23 generates sensing data, based on laser reflected light of laser light incident with the second beam diameter on the incidence position FP having a distance from the optical input/output end OI equal to or more than a threshold value and reflected light associated with laser light incident with the first beam diameter on the incidence position FP having a distance from the optical input/output end OI less than a threshold value.

For example, when detecting that cracking has occurred in the object MT, the data generation means 23 detects occurrence of cracking in the focal position FP having a distance to the optical input/output end OI less than a threshold value, based on intensity of laser reflected light of laser light incident with the first beam diameter. Further, the data generation means 23 detects occurrence of cracking in the focal position FP having a distance to the optical input/output end OI equal to or more than a threshold value, based on intensity of laser reflected light of laser light incident with the second beam diameter.

As described above, in the ranging device 1A, the light irradiation limiting means 32 causes the light-emitting means 11 not to output laser light having the second beam diameter, to the incidence position FP having a distance less than a threshold value among distances from the optical input/output end OI to each of a plurality of focal positions FP. As described in description of the ranging device 1, laser light diffuses more when a distance from an emission position from which the laser light is emitted to a position of incidence is long. Meanwhile, laser light is less likely to diffuse when a distance from an emission position from which the laser light is emitted to a position of incidence is short. Thus, there is less possibility of decline of resolution during measurement using LiDAR at a position close to an emission position. Thus, in the ranging device 1A, the light-emitting means 11 outputs laser light having the second beam diameter to only the incidence position FP having a distance from the optical input/output end OI equal to or more than a threshold value, thereby enabling more efficient measurement using LiDAR.

Figure 7:
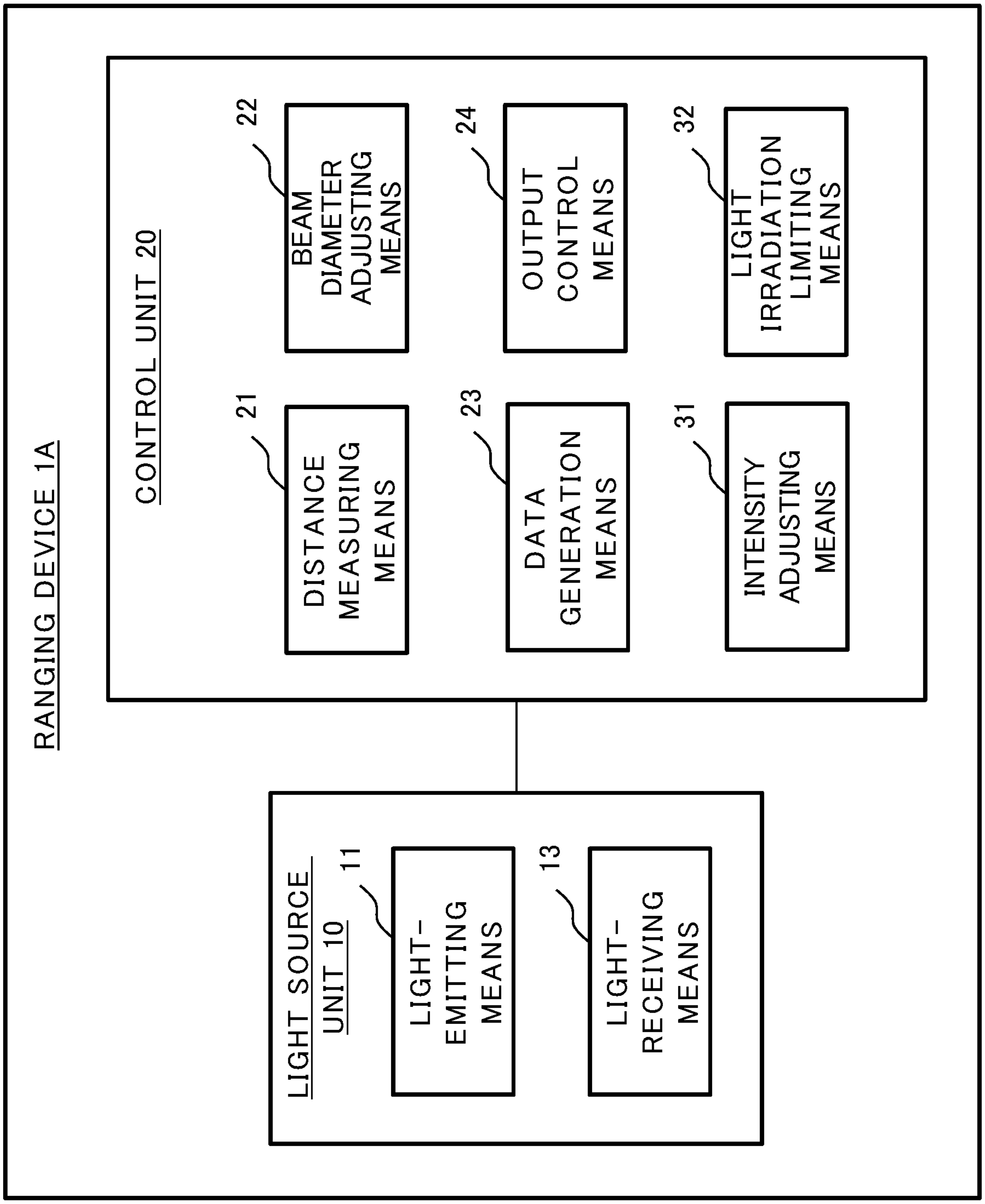
FIG. 7 is a block diagram illustrating a configuration example of a modification example of the ranging device according to the first example embodiment of the present invention.

Note that, in FIG. 7, components of the light-emitting means 11, a light-receiving means 13, the distance measuring means 21, the beam diameter adjustment means 22, the data generation means 23, the output control means 24, the intensity adjustment means 31, and the light irradiation limiting means 32 are provided in one ranging device 1A. Meanwhile, the components are not necessarily provided in one device, and may be provided in mutually different devices and operate as one system.

Second Example Embodiment

Figure 8:
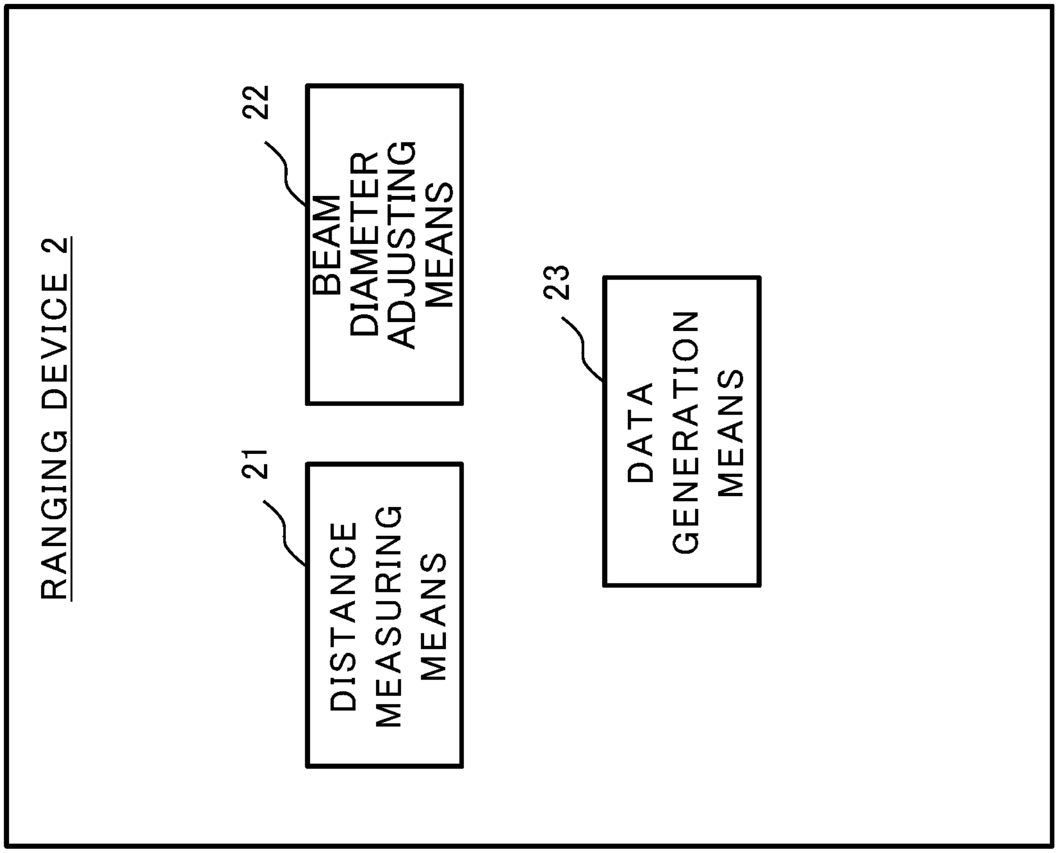
FIG. 8 is a block diagram illustrating a configuration example of a ranging device according to a second example embodiment of the present invention.
Figure 9:
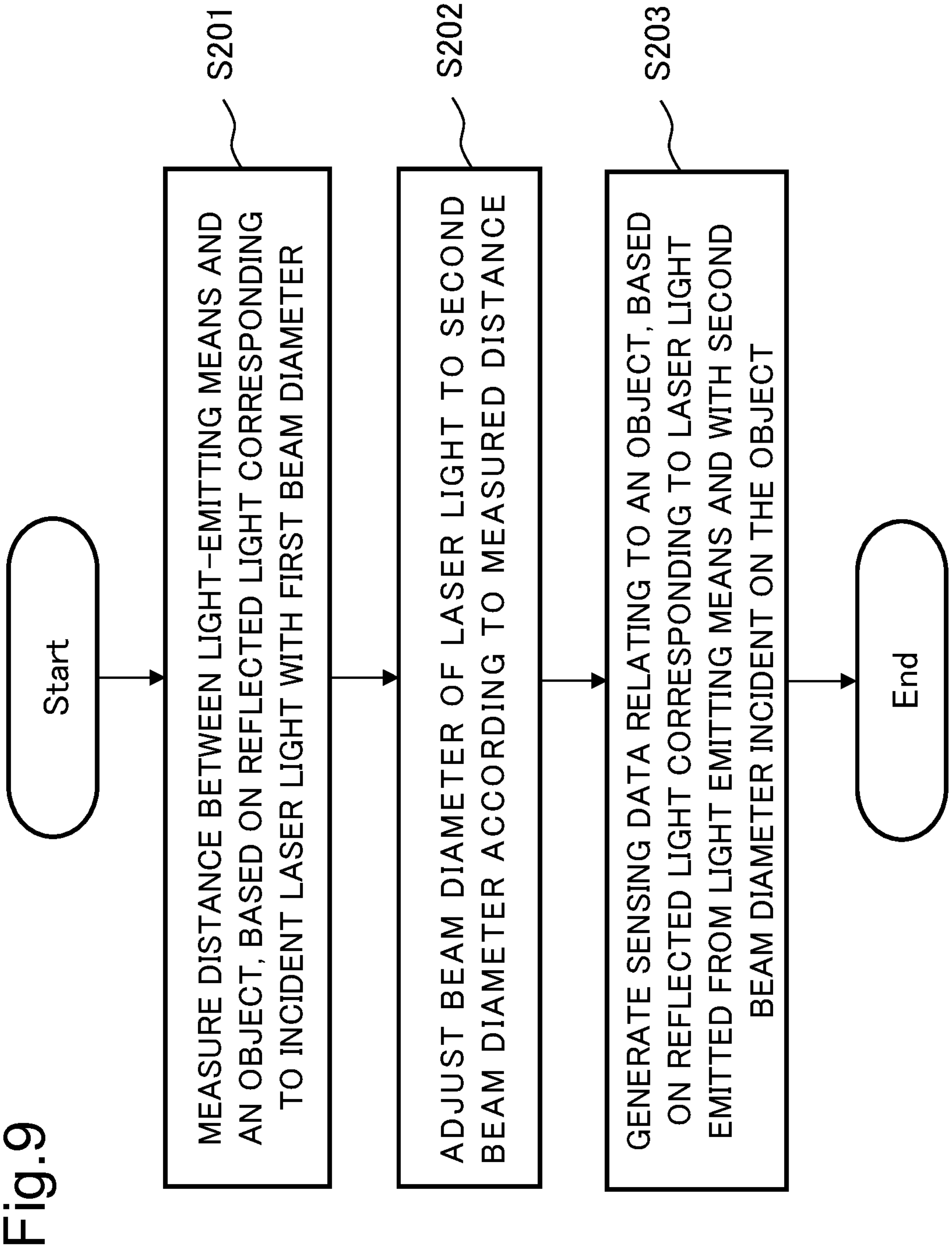
FIG. 9 is a flowchart illustrating an operation example of the ranging device according to the second example embodiment of the present invention.

A ranging device 2 according to a second example embodiment will be described based on FIGS. 8 and 9. The ranging device 2 includes a distance measuring means 21, a beam diameter adjustment means 22, and a data generation means 23, as illustrated in FIG. 8. The ranging device 2 may further include a component, a function, and a connection relationship similar to the above-described ranging devices 1 and 1A. Note that, the distance measuring means 21, the beam diameter adjustment means 22, and the data generation means 23 are not necessarily provided in one ranging device 2, and may be provided in different devices and operate as one system. Further, a program causing an information processing device such as a computer to achieve each of the distance measuring means 21, the beam diameter adjustment means 22, and the data generation means 23 may be stored by a storage medium such as a hard disk drive.

The distance measuring means 21 measures a distance between an unillustrated light-emitting means and an incidence position of an object, based on reflected light of laser light incident with a first beam diameter on the incidence position from the light-emitting means. Note that, the distance measuring means 21 may include a component, a function, and a connection relationship similar to the distance measuring means 21 of the above-described ranging devices 1 and 1A.

The beam diameter adjustment means 22 adjusts a beam diameter of laser light being incident on an incidence position to a second beam diameter, according to a distance measured by the distance measuring means 21. Note that, the beam diameter adjustment means 22 may include a component, a function, and a connection relationship similar to the beam diameter adjustment means 22 of the above-described ranging devices 1 and 1A.

The data generation means 23 generates sensing data relating to an object, based on reflected light associated with laser light incident with the second beam diameter on an incidence position FP from the light-emitting means. Note that, the data generation means 23 may include a component, a function, and a connection relationship similar to the data generation means 23 of the above-described ranging devices 1 and 1A.

Next, an operation of the ranging device 2 will be described by using FIG. 9. FIG. 9 is a flowchart illustrating an operation of the ranging device 2.

The distance measuring means 21 measures a distance between the light-emitting means and an object, based on reflected light associated with laser light incident on an incidence position with the first beam diameter (S201).

The beam diameter adjustment means 22 adjusts a beam diameter of laser light being incident on the incidence position to the second beam diameter according to the measured distance (S202). In this case, the beam diameter adjustment means 22 adjusts a beam diameter of laser light in such a way that the second beam diameter at the incidence position becomes smaller than the first beam diameter at the incidence position.

The data generation means 23 generates sensing data relating to the object, based on reflected light associated with the laser light incident with the second beam diameter on the incidence position from the light-emitting means (S203).

In the above, the ranging device 2 has been described. As described above, the ranging device 2 includes the distance measuring means 21, the beam diameter adjustment means 22, and the data generation means 23. The distance measuring means 21 measures a distance between the light-emitting means and an incidence position of an object, based on reflected light of laser light incident with the first beam diameter on the incidence position FP from the light-emitting means. The beam diameter adjustment means 22 adjusts a beam diameter of laser light being output from the light-emitting means to the second beam diameter, according to the distance between the light-emitting means and the incidence position FP. The data generation means 23 generates sensing data relating to the object, based on reflected light associated with the laser light incident with the second beam diameter from the light-emitting means. Further, the beam diameter adjustment means 22 adjusts a beam diameter of the laser light in such a way that the second beam diameter at the incidence position becomes smaller than the first beam diameter at the incidence position.

As described above, in the ranging device 2, sensing data are generated based on reflected light of laser light having the second beam diameter adjusted according to a distance between the light-emitting means and the incidence position FP. In general, light has a property of diffusing when propagating a longer distance in a free space. Thus, even laser light diffuses when a distance from an emission position from which the laser light is emitted to a position of incidence is long. Thus, when an object is irradiated with light by using LiDAR, a beam diameter of laser light incident on a position far from an emission position is larger than a beam diameter of laser light incident on a position close to an emission position, and thus, resolution during measurement using LiDAR declines at a position far from an emission position.

Meanwhile, in the above ranging device 2, a beam diameter (second beam diameter) at an incidence position of laser light for generating sensing data is adjusted according to a distance between the light-emitting means and the incidence position FP. Thus, the ranging device 2 prevents decline of resolution during measurement using LiDAR even at a position far from an emission position by setting the second beam diameter smaller than the first beam diameter, and thus, can improve spatial resolution.

Note that, in FIG. 8, components of the distance measuring means 21, the beam diameter adjustment means 22, and the data generation means 23 are provided in one ranging device 2. Meanwhile, the components are not necessarily provided in one device, and may be provided in mutually different devices and operate as one system.

(Supplementary Note 1)

A ranging device including:

a distance measuring means for measuring a distance between a light-emitting means and an incidence position of an object, based on reflected light of laser light incident with a first beam diameter on the incidence position from the light-emitting means;

a beam diameter adjustment means for adjusting a beam diameter of laser light being incident on the incidence position to a second beam diameter according to the distance; and a data generation means for generating sensing data relating to the object, based on reflected light associated with the laser light incident with the second beam diameter on the incidence position from the light-emitting means, wherein the beam diameter adjustment means adjusts a beam diameter of the laser light in such a way that the second beam diameter at the incidence position becomes smaller than the first beam diameter at the incidence position.

(Supplementary Note 2)

The ranging device according to supplementary note 1, wherein the data generation means generates the sensing data according to spatial resolution appropriate to the second beam diameter at the incidence position.

(Supplementary Note 3)

The ranging device according to supplementary note 2, wherein the data generation means generates, as the sensing data, a three-dimensional model of the object according to spatial resolution appropriate to the second beam diameter at the incidence position.

(Supplementary Note 4)

The ranging device according to any one of supplementary notes 1 to 3, wherein the object is a communication steel tower.

(Supplementary Note 5)

The ranging device according to any one of supplementary notes 1 to 4, further including an output control means for executing control of outputting the sensing data.

(Supplementary Note 6)

The ranging device according to any one of supplementary notes 1 to 5, further including an intensity adjustment means for causing the light-emitting means to output the laser light having the second beam diameter with intensity appropriate to the distance.

(Supplementary Note 7)

The ranging device according to any one of supplementary notes 1 to 6, further including a light irradiation limiting means for controlling the light-emitting means, wherein the distance measuring means measures a plurality of the distances between the light-emitting means and each of a plurality of the incidence positions, the light irradiation limiting means causes the light-emitting means to output the laser light having the second beam diameter to the incidence position having the distance equal to or more than a threshold value among the plurality of the distances, and causes the light-emitting means not to output the laser light having the second beam diameter to the incidence position having the distance less than the threshold value among the plurality of the distances, and the data generation means generates the sensing data, based on reflected light associated with the laser light incident with the second beam diameter on the incidence position having the distance equal to or more than the threshold value and reflected light associated with the laser light incident with the first beam diameter on the incidence position having the distance less than the threshold value.

(Supplementary Note 8)

A ranging device control method including:

measuring a distance between a light-emitting means and an incidence position of an object, based on reflected light of laser light incident with a first beam diameter on the incidence position from the light-emitting means;

adjusting a beam diameter of laser light being incident on the object to a second beam diameter smaller than the first beam diameter according to the distance; and generating sensing data relating to the object, based on reflected light associated with the laser light incident with the second beam diameter from the light-emitting means.

(Supplementary Note 9)

A ranging system including:

a distance measuring means for measuring a distance between a light-emitting means and an incidence position of an object, based on reflected light of laser light incident with a first beam diameter on the incidence position from the light-emitting means;

a beam diameter adjustment means for adjusting a beam diameter of laser light being incident on the incidence position to a second beam diameter according to the distance; and a data generation means for generating sensing data relating to the object, based on reflected light associated with the laser light incident with the second beam diameter on the incidence position from the light-emitting means, wherein the beam diameter adjustment means adjusts a beam diameter of the laser light in such a way that the second beam diameter at the incidence position becomes smaller than the first beam diameter at the incidence position.

(Supplementary Note 10)

A storage medium that stores a program causing an information processing device to execute:

processing of measuring a distance between a light-emitting means and an incidence position of an object, based on reflected light of laser light incident with a first beam diameter on the incidence position from the light-emitting means;

processing of adjusting a beam diameter of laser light being incident on the object to a second beam diameter smaller than the first beam diameter according to the distance; and processing of generating sensing data relating to the object, based on reflected light associated with the laser light incident with the second beam diameter from the light-emitting means.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

1, 1A, 2 Ranging device
10 Light source unit
11 Light-emitting means
13 Light-receiving means
20 Control unit
21 Distance measuring means
22 Beam diameter adjustment means
23 Data generation means
24 Output control means
31 Intensity adjustment means
32 Light irradiation limiting means

What is claimed is:

1. A ranging device comprising:

at least one memory configured to store instructions; and at least one processor configured to execute the instructions to:

measure a distance between a light-emitting device and an incidence position of an object, based on reflected light of laser light being incident with a first beam diameter on the incidence position from the light-emitting device:

adjust a beam diameter of laser light being incident on the incidence position to a second beam diameter according to the distance; and generate sensing data relating to the object, based on reflected light associated with the laser light being incident with the second beam diameter on the incidence position from the light-emitting device, wherein the at least one processor adjusts a beam diameter of the laser light in such a way that the second beam diameter at the incidence position becomes smaller than the first beam diameter at the incidence position, wherein said ranging device further comprises a light irradiation limiting device controlling the light-emitting device, wherein the at least one processor measures a plurality of the distances between the light-emitting device and each of a plurality of the incidence positions, the light irradiation limiting device causes the light-emitting device to output the laser light having the second beam diameter to the incidence position having the distance equal to or more than a threshold value among the plurality of the distances, and causes the light-emitting device not to output the laser light having the second beam diameter to the incidence position having the distance less than the threshold value among the plurality of the distances, and the at least one processor generates the sensing data, based on reflected light associated with the laser light being incident with the second beam diameter on the incidence position having the distance equal to or more than the threshold value, and reflected light associated with the laser light being incident with the first beam diameter on the incidence position having the distance less than the threshold value.

2. The ranging device according to claim 1, wherein the at least one processor generates the sensing data according to spatial resolution appropriate to the second beam diameter at the incidence position.

3. The ranging device according to claim 2, wherein the at least one processor generates, as the sensing data, a three-dimensional model of the object according to spatial resolution appropriate to the second beam diameter at the incidence position.

4. The ranging device according to claim 1, wherein the object is a communication steel tower.

5. The ranging device according to claim 1, wherein the at least one processor executes control of outputting the sensing data.

6. The ranging device according to claim 1, wherein the at least one processor causes the light-emitting device to output the laser light having the second beam diameter with intensity appropriate to the distance.

7. A ranging device control method comprising:

measuring a distance between a light-emitting device and an incidence position of an object, based on reflected light of laser light being incident with a first beam diameter on the incidence position from the light-emitting device;

adjusting a beam diameter of laser light being incident on the object to a second beam diameter smaller than the first beam diameter according to the distance;

generating sensing data relating to the object, based on reflected light associated with the laser light being incident with the second beam diameter from the light-emitting device;

measuring a plurality of the distances between the light-emitting device and each of a plurality of the incidence positions;

outputting the laser light having the second beam diameter to the incidence position having the distance equal to or more than a threshold value among the plurality of the distances, and not outputting the laser light having the second beam diameter to the incidence position having the distance less than the threshold value among the plurality of the distances; and generating the sensing data, based on reflected light associated with the laser light being incident with the second beam diameter on the incidence position having the distance equal to or more than the threshold value, and reflected light associated with the laser light being incident with the first beam diameter on the incidence position having the distance less than the threshold value.

8. A ranging system comprising:

at least one memory configured to store instructions; and at least one processor configured to execute the instructions to:

measure a distance between a light-emitting device and an incidence position of an object, based on reflected light of laser light being incident with a first beam diameter on the incidence position from the light-emitting device:

adjust beam diameter adjustment means for adjusting a beam diameter of laser light being incident on the incidence position to a second beam diameter according to the distance; and generate sensing data relating to the object, based on reflected light associated with the laser light being incident with the second beam diameter on the incidence position from the light-emitting device, wherein the at least one processor adjusts a beam diameter of the laser light in such a way that the second beam diameter at the incidence position becomes smaller than the first beam diameter at the incidence position, wherein said ranging device further comprises a light irradiation limiting device controlling the light-emitting device, wherein the at least one processor measures a plurality of the distances between the light-emitting device and each of a plurality of the incidence positions, the light irradiation limiting device causes the light-emitting device to output the laser light having the second beam diameter to the incidence position having the distance equal to or more than a threshold value among the plurality of the distances, and causes the light-emitting device not to output the laser light having the second beam diameter to the incidence position having the distance less than the threshold value among the plurality of the distances, and the at least one processor generates the sensing data, based on reflected light associated with the laser light being incident with the second beam diameter on the incidence position having the distance equal to or more than the threshold value, and reflected light associated with the laser light being incident with the first beam diameter on the incidence position having the distance less than the threshold value.

9. The ranging device according to claim 2, wherein the object is a communication steel tower.

10. The ranging device according to claim 3, wherein the object is a communication steel tower.

11. The ranging device according to claim 2, wherein the at least one processor executes control of outputting the sensing data.

12. The ranging device according to claim 3, wherein the at least one processor executes control of outputting the sensing data.

13. The ranging device according to claim 4, wherein the at least one processor executes control of outputting the sensing data.

14. The ranging device according to claim 2, wherein the at least one processor causes the light-emitting device to output the laser light having the second beam diameter with intensity appropriate to the distance.

15. The ranging device according to claim 3, wherein the at least one processor causes the light-emitting device to output the laser light having the second beam diameter with intensity appropriate to the distance.

16. The ranging device according to claim 4, wherein the at least one processor causes the light-emitting device to output the laser light having the second beam diameter with intensity appropriate to the distance.

17. The ranging device according to claim 5, wherein the at least one processor causes the light-emitting device to output the laser light having the second beam diameter with intensity appropriate to the distance.

18. A ranging device comprising:

at least one memory configured to store instructions; and at least one processor configured to execute the instructions to:

measure a distance between a light-emitting device and an incidence position of an object, based on reflected light of laser light being incident with a first beam diameter on the incidence position from the light-emitting device:

adjust a beam diameter of laser light being incident on the incidence position to a second beam diameter according to the distance; and generate sensing data relating to the object, based on reflected light associated with the laser light being incident with the second beam diameter on the incidence position from the light-emitting device, wherein the at least one processor adjusts a beam diameter of the laser light in such a way that the second beam diameter at the incidence position becomes smaller than the first beam diameter at the incidence position, wherein the at least one processor generates the sensing data according to spatial resolution appropriate to the second beam diameter at the incidence position, the ranging device further comprising:

a light irradiation limiting device controlling the light-emitting device, wherein the at least one processor measures a plurality of the distances between the light-emitting device and each of a plurality of the incidence positions, the light irradiation limiting device causes the light-emitting device to output the laser light having the second beam diameter to the incidence position having the distance equal to or more than a threshold value among the plurality of the distances, and causes the light-emitting device not to output the laser light having the second beam diameter to the incidence position having the distance less than the threshold value among the plurality of the distances, and the at least one processor generates the sensing data, based on reflected light associated with the laser light being incident with the second beam diameter on the incidence position having the distance equal to or more than the threshold value, and reflected light associated with the laser light being incident with the first beam diameter on the incidence position having the distance less than the threshold value, wherein the at least one processor generates the sensing data according to spatial resolution appropriate to the second beam diameter at the incidence position.

19. A ranging device comprising:

at least one memory configured to store instructions; and at least one processor configured to execute the instructions to:

measure a distance between a light-emitting device and an incidence position of an object, based on reflected light of laser light being incident with a first beam diameter on the incidence position from the light-emitting device:

adjust a beam diameter of laser light being incident on the incidence position to a second beam diameter according to the distance; and generate sensing data relating to the object, based on reflected light associated with the laser light being incident with the second beam diameter on the incidence position from the light-emitting device, wherein the at least one processor adjusts a beam diameter of the laser light in such a way that the second beam diameter at the incidence position becomes smaller than the first beam diameter at the incidence position, wherein the at least one processor generates, as the sensing data, a three-dimensional model of the object according to spatial resolution appropriate to the second beam diameter at the incidence position, the ranging device further comprising:

a light irradiation limiting device controlling the light-emitting device, wherein the at least one processor measures a plurality of the distances between the light-emitting device and each of a plurality of the incidence positions, the light irradiation limiting device causes the light-emitting device to output the laser light having the second beam diameter to the incidence position having the distance equal to or more than a threshold value among the plurality of the distances, and causes the light-emitting device not to output the laser light having the second beam diameter to the incidence position having the distance less than the threshold value among the plurality of the distances, and the at least one processor generates the sensing data, based on reflected light associated with the laser light being incident with the second beam diameter on the incidence position having the distance equal to or more than the threshold value, and reflected light associated with the laser light being incident with the first beam diameter on the incidence position having the distance less than the threshold value.

* * * * *